United States Patent
Rajala et al.

(10) Patent No.: US 10,264,391 B2
(45) Date of Patent: Apr. 16, 2019

(54) METHOD AND SYSTEM FOR LOCATING A WIRELESS TRACKING DEVICE

(71) Applicant: Numerex Corp., Atlanta, GA (US)

(72) Inventors: Yoganand Rajala, Alpharetta, GA (US); Jeffery O. Smith, Dallas, TX (US)

(73) Assignee: Numerex Corp., Atlanta, GA (US)

( * ) Notice: Subject to any disclaimer, the term of this patent is extended or adjusted under 35 U.S.C. 154(b) by 0 days.

(21) Appl. No.: 15/695,496

(22) Filed: Sep. 5, 2017

(65) Prior Publication Data

US 2017/0366931 A1 Dec. 21, 2017

Related U.S. Application Data

(62) Division of application No. 14/789,085, filed on Jul. 1, 2015, now Pat. No. 9,794,742.

(51) Int. Cl.
*H04W 4/021* (2018.01)

(52) U.S. Cl.
CPC ................... *H04W 4/021* (2013.01)

(58) Field of Classification Search
CPC .................................................... H04W 4/021
USPC .................................................... 455/456.1
See application file for complete search history.

(56) References Cited

U.S. PATENT DOCUMENTS

| | | | |
|---|---|---|---|
| 2006/0211430 A1 | 9/2006 | Persico | |
| 2010/0127919 A1* | 5/2010 | Curran | G01S 19/40 340/573.4 |
| 2014/0337123 A1* | 11/2014 | Nuernberg | G06Q 30/0246 705/14.45 |

* cited by examiner

*Primary Examiner* — Chuck Huynh
(74) *Attorney, Agent, or Firm* — King & Spalding

(57) ABSTRACT

A wireless tracking device can utilize a location detector, such as a GPS receiver or a short-range receiver, to provide locational information for the wireless tracking device. The wireless tracking device can transmit the locational information over a cellular network. Geofences can help manage location of the wireless tracking device. An analysis can be conducted at the wireless tracking device, at a server, or at some other appropriate location to assess integrity of the locational information. A determination as to whether the wireless tracking device is in an area can be based on the locational information and the integrity of the locational information.

20 Claims, 4 Drawing Sheets

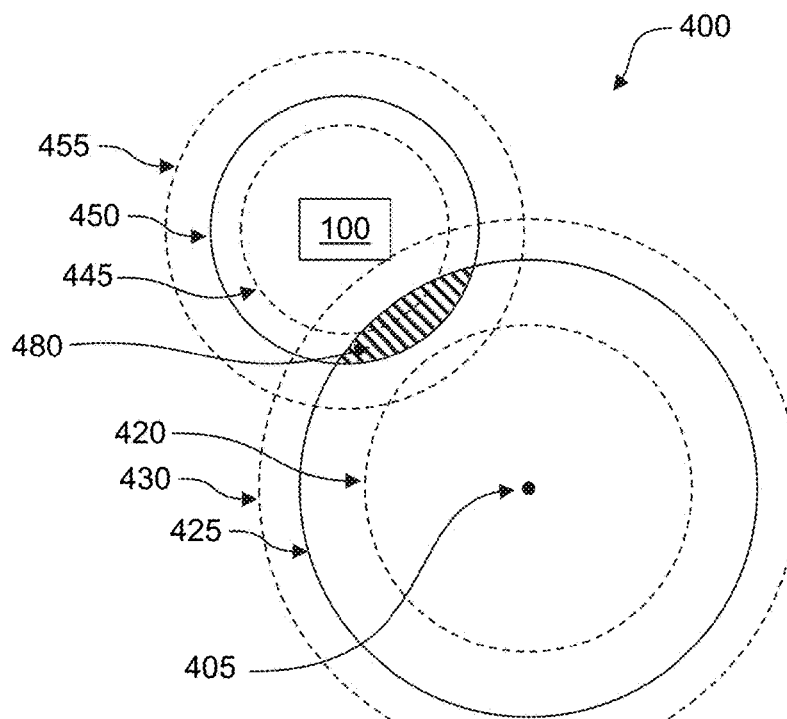
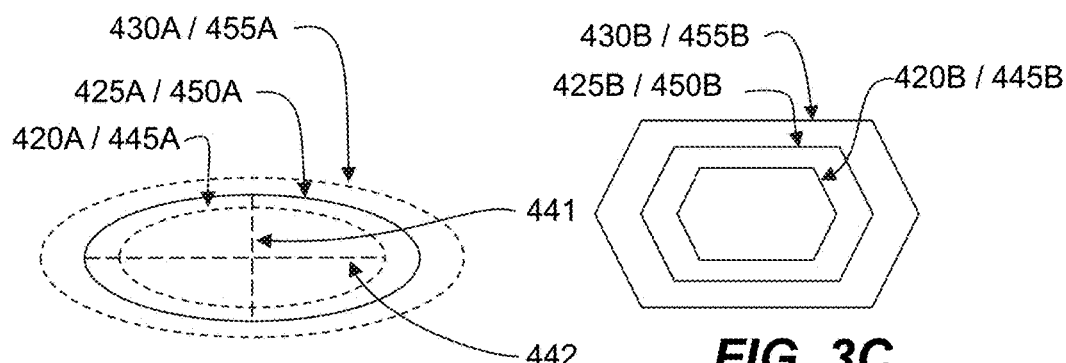
FIG. 3A
FIG. 3B
FIG. 3C

METHOD AND SYSTEM FOR LOCATING A WIRELESS TRACKING DEVICE

CROSS REFERENCE TO RELATED APPLICATION

This patent application is a divisional application of U.S. patent application Ser. No. 14/789,085, filed Jul. 1, 2015. The entire contents of the patent application identified above is hereby incorporated herein by reference.

TECHNICAL FIELD

The present technology relates generally to devices for tracking locations of people and objects, and more particularly to determining whether a wireless tracking device is in a location based on locational information transmitted from the device and integrity of the locational information.

BACKGROUND

Wireless tracking devices can be useful for tracking people, animals, and inanimate objects, for example by attaching or otherwise associating a wireless tracking device to the item being tracked. The wireless tracking device can transmit a wireless signal that conveys locational information about the wireless tracking device, and thus about the item. In many cases, uncertainty or inaccuracy may be associated with the transmitted locational information. Conventional approaches to location management of wireless tracking devices generally lack adequate provisions for coping with or mitigating such uncertainty or inaccuracy.

Accordingly, there are needs in the art for managing location detection. For example, need exists for taking uncertainty, inaccuracy, or information integrity into account. A technology addressing such a need, or some related deficiency in the art, would support more robust location management.

SUMMARY

In one aspect of the disclosure, a wireless tracking device can transmit locational information over a wireless network. One or more indicators of integrity can be associated with the locational information, for example reflecting accuracy or uncertainty of the locational information. An indicator of integrity and the locational information can be utilized to make a determination about whether the wireless tracking device is in an area.

In another aspect of the disclosure, signal processing can compensate for error, uncertainty, or diminished integrity in locational measurements to support determining whether a wireless tracking device is in a geographic area of interest. A signal can convey information about location of a wireless tracking device. The information can define a geographical area in which the wireless tracking device is deemed to be located. The determination can be made based on computing overlap between the geographic area of interest and the geographic area in which the wireless tracking device is deemed to be located.

The foregoing discussion of wireless tracking in an environment of uncertainty is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE DRAWINGS

FIGS. 3A, 3B, and 3C (collectively FIG. 3) are illustrations describing determining whether a wireless tracking device is in an area of interest in accordance with some example embodiments of the present technology.

Figure 1:
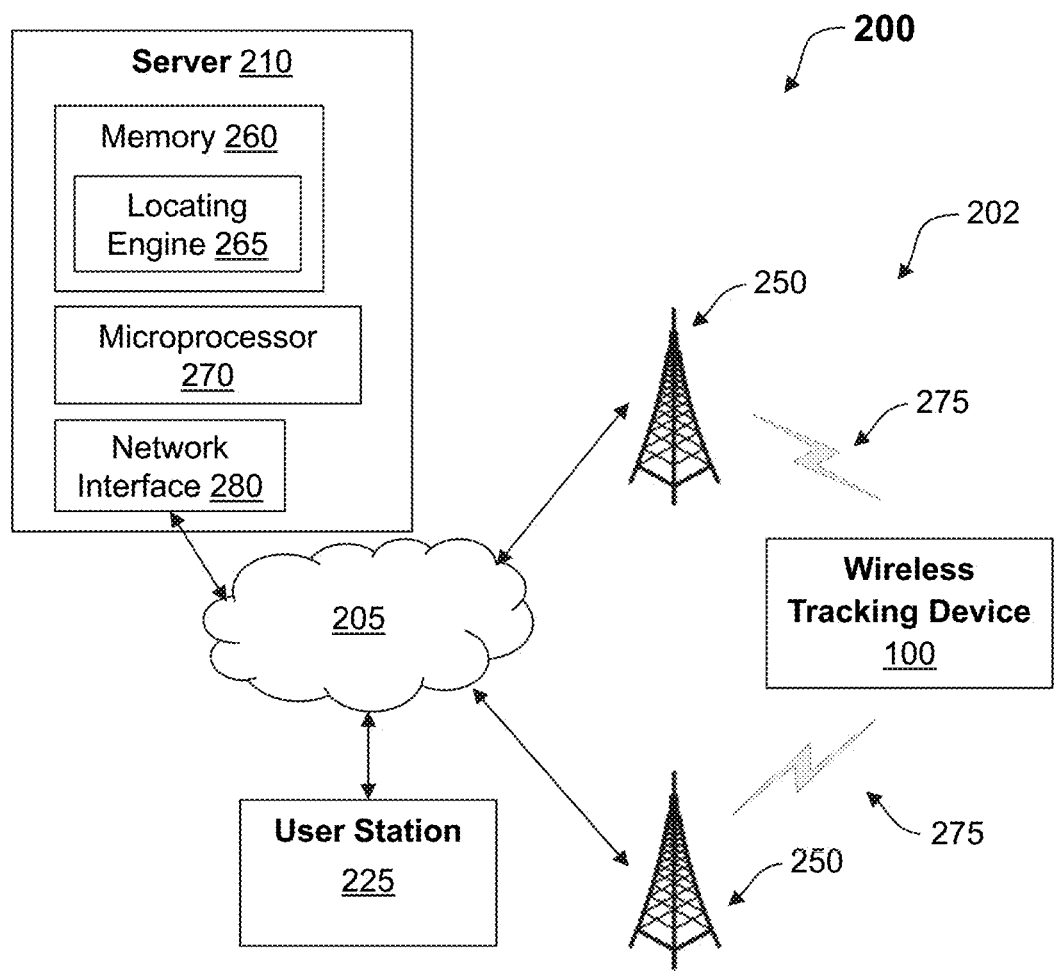
FIG. 1 is functional block diagram of a wireless tracking system in accordance with some example embodiments of the present technology.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

Certain embodiments of the disclosure can improve operations of a computer-based system and process for tracking location of a device, for example in an environment in which locational information has uncertainty or diminished integrity that would otherwise negatively impact performance.

Some example embodiments of the present technology will be discussed in further detail below with reference to the figures. However, the present technology can be embodied in many different forms and should not be construed as limited to the embodiments set forth herein. Rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Some of the embodiments may comprise or involve processes that will be discussed below. Certain steps in such processes may naturally need to precede others to achieve intended functionality or results. However, the technology is not limited to the order of the steps described to the extent that reordering or re-sequencing does not render the processes useless or nonsensical. Thus, it is recognized that some steps may be performed before or after other steps or in parallel with other steps without departing from the scope and spirit of this disclosure.

Turning now to FIG. 1, this figure illustrates a functional block diagram of a wireless tracking system 200 in accordance with some example embodiments of the present technology. The illustrated wireless tracking system 200 can be viewed as an example operating environment for a wireless tracking device 100 or for technology for determining location under uncertain conditions.

In the illustrated embodiment, the wireless tracking system 200 comprises a cellular system 202. As illustrated, a wireless tracking device 100 is located near two cell towers 250 and may communicate with either via respective communication channels 275. The cell towers 250 communicate with a server 210 over a network 205. In some example embodiments, the network 205 comprises the Internet.

A user station 225 is also connected to the network 205. The user station 225 can communicate with the wireless tracking device 100 through the server 210, or alternatively directly. The user station 225 provides an interface through which a user can interact with the wireless tracking device 100 and the server 210. For example, in an embodiment in which the wireless tracking device 100 comprises an offender monitor, an officer may track offender movements and historical movement patterns through the user station 225. In various embodiments, the user station 225 can comprise a smartphone or other handheld device, a laptop, a workstation, a personal computer, or other appropriate system.

The server 210 provides location services for the wireless tracking device 100 as well as for other wireless tracking device (not illustrated) that may be attached to people, animals, or objects. In some embodiments, the server 210 can comprise a gateway or middleware server. Additionally, the server 210 may store configuration data that may be downloaded to the wireless tracking device 100, such as during startup or rebooting.

In the illustrated example embodiment, the server 210 comprises a network interface, for example an Internet connection. As illustrated, the server 210 further comprises memory 260 and a processor 270 or controller that is operably linked to the memory 260 and to the network interface 280. In some example embodiments, the server 210 can comprise a group or cluster of servers acting as a single logical entity.

As illustrated, the memory 260 comprises or stores a locating engine 265 for managing location of the wireless tracking device 100, as well as for other wireless tracking devices linked to the cellular system 202. The locating engine 265 can comprise instructions for device location in an environment of measurement uncertainty or diminished integrity, as further discussed below and as represented in flowchart form by FIG. 4.

Figure 2:
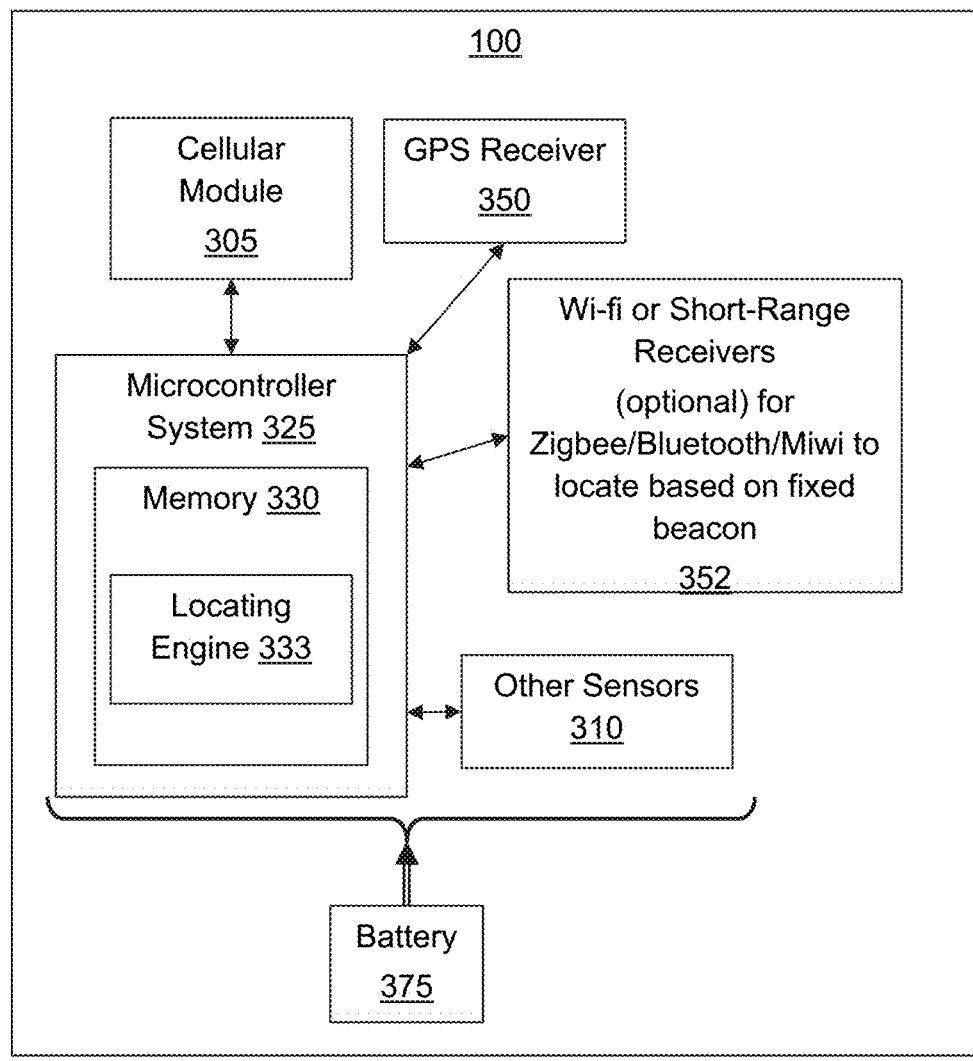
FIG. 2 is a functional block diagram of a wireless tracking device in accordance with some example embodiments of the present technology.

Turning now to FIG. 2, this figure illustrates a functional block diagram for the example wireless tracking device 100 according to some embodiments of the present technology. In the illustrated embodiment, the wireless tracking device 100 comprises a cellular module 305, a GPS receiver 350, a microcontroller system 325, and other sensors 310, all of which are powered by one or more on-board batteries 375. The cellular module 305 comprises an example embodiment of a radio. The GPS receiver 350 comprises an example embodiment of a location detector.

The other sensors 310 may include tamper detectors, orientation sensors, switches, microphones, gyroscopes, accelerometers, compasses, etc. Example tamper detectors can include switches that open or close to provide an electrical signal when a housing is opened or otherwise breached, fiber optic strands that are embedded in an offender monitor strap to break and stop transmitting an optical signal when the strap is compromised, and other appropriate tamper sensing devices.

In some example embodiments, the cellular module 305 and the GPS receiver 350 are integrated into a single modem module or chip or chip set. In operation, the cellular module 305 maintains a connection to one or more cell towers 250 over one or more wireless channels 275 through a wireless network as illustrated in FIG. 1. In an example embodiment, the cellular module 305 continuously attempts to keep a cellular connection available to the tower 250. In such an embodiment, the server 210 can control the operation of the wireless tracking device 100 by sending commands or other data to the wireless tracking device 100. In various embodiments, the cellular module 305 can comprise CDMA, GSM, UMTS, HSPA, or LTE technologies.

When triggered by the microcontroller system 325, a GPS location reading occurs on the GPS receiver 350. The microcontroller system 325 can further control the cellular module 305 in connection with transmitting acquired locational information (GPS data or otherwise), notifications, alarms, and other appropriate data and with receiving commands and other data. In some embodiments, locational information is obtained utilizing cell-tower-based triangulation, such as advanced forward link trilateration (AFLT), or using a signal-strength-based location approach, such as received signal strength indicator (RSSI) based on tower or Wi-fi signals. The wireless tracking device 100 can utilize such technologies as embodiments of a location detector to augment or support, or as a substitution for, satellite-based location tracking. Further, GPS tracking can utilize assisted GPS (A-GPS) to improve location acquisition speed.

As illustrated, the wireless tracking device 100 may comprise one or more Wi-fi or short-range receivers 352, for example as optional communication devices and/or as location detectors. The wireless tracking device 100 can utilize the Wi-fi or short-range receivers 352 to determine location utilizing a fixed-beacon approach, for example.

In an example embodiment, the microcontroller system 325 comprises a low-power microcontroller and associated memory 330. The microcontroller system 325 can comprise a microprocessor or other appropriate processor, for example. Example embodiments of the memory 330 can comprise volatile and nonvolatile memory, such as random access memory (RAM) and flash memory for example. In an example embodiment, the memory 330 can comprise firmware for executing management and control functions. For example, the memory 330 can comprise persistent memory that stores program code, including a locating engine 333. An example embodiment of the locating engine 333 comprises computer executable instructions for utilization of the GPS receiver 350 or other location detector, or for code for implementing process 400 that is illustrated in flowchart form in FIG. 4 and discussed below.

In some example embodiments, the wireless tracking device 100 comprises a tracking device for monitoring the movement of an individual. For example, the wireless tracking device 100 can comprise an offender monitor, which may include a strap that extends around an appendage of an offender who is being monitored, such as around the offender's leg or arm. The strap can be attached to a housing that encloses electrically powered elements. The offender may be a criminal on parolee or a person who is under a government order for monitoring or a restraining order or house arrest from a court or other authority, for example.

Turning now to FIG. 3, this figure provides three illustrations about determining whether a wireless tracking device 100 is in an area of interest according to some example embodiments of the present technology. As further discussed below, the determination can compensate for location uncertainty or diminished integrity of locational information.

FIG. 3A illustrates an example scenario in which the wireless tracking device 100 is located in the general vicinity of a point 405 of interest. The point 405 of interest may represent a person, a place, or a thing or a geographical coordinate or region that might not associated be with any particular person, place, or thing.

In some embodiments, the point 405 is well defined and has an associated geofence 425 that is also well defined. For example, the point 405 might define a school location, and the geofence 425 might define a perimeter that a parole officer or other user has drawn around the school on an electronic map in order to specify a geographical area that is off limits to a parolee.

However, in some other embodiments, the point 405 has a degree of inaccuracy or uncertainty. For example, the point 405 may have coordinates determined by a GPS signal that exhibits noise or otherwise comprises imprecision. For example, the point 405 could specify a location of a person who moves while under GPS tracking. The geofence 425 could provide a protected space around the person, such as an offender's victim. When the victim moves, the point 405 can move with the victim, and the geofence 425 can move so that a safe zone follows and constantly surrounds the victim. In this scenario, the victim may carry his or her own wireless tracking device that dynamically reports the victim's location to the server 210. The server 210, in turn, can transmit the victim's location to the wireless tracking device 100 that is worn by the offender, so the wireless tracking device 100 can keep track of the victim's location and take action if the offender encroaches on the victim's safe zone. In this type of scenario, the point 405 may exhibit uncertainty due to locational resolution, signal interference, noise, or other source of locational information degradation or impairment. To address such uncertainty, as further discussed below, the geofence 425 may have an inner boundary of confidence 420 and an outer boundary of confidence 430, which may represent circular error probable (CEP) confidence intervals for example.

In various embodiments and depending on whether well defined or exhibiting uncertainty, the geofence 425 may be exclusionary or inclusionary. In some embodiments, the geofence 425 can cause an action, for example providing a notification, when the wireless tracking device 100 crosses or violates a geofence boundary and enters a prohibited area. For example, the geofence 425 could provide a boundary around a residence or workplace of a victim of an offender that is being tracked by the wireless tracking device 100. As another example, an offender with a record of child abuse may be prohibited from entering an area that surrounds a school and that is defined by the geofence 425. An act of the wireless tracking device 100 crossing the geofence 425 to enter the area can raise an alarm or other notification.

In addition to an exclusionary function, the geofence 425 may provide an inclusionary function to establish an area that a person or item is not allowed to leave. For example, a parolee's movements may be confined to a designated area that has an associated geofence. In this case, the geofence 425 may establish an included or allowed area. If the parolee leaves the area, the parolee's parole officer can receive a notification that is automatically generated when the parolee crosses the geofence.

To reflect uncertainty in location of the point 405 (for example in connection with a GPS signal as discussed above), the geofence 425 can have an associated inner boundary of confidence 420 and an associated outer boundary of confidence 430. The inner boundary of confidence 420 can define an innermost location and size of the geofence within a threshold level of confidence based on statistical analysis of locational information for the point 405. Similarly, the outer boundary of confidence 430 can define an outermost location and size of the geofence within a threshold level of confidence based on statistical analysis of locational information for the point 405. In various embodiments, the threshold levels of confidence may lie in a range of 25 percent to 99.9 percent, for example.

In some example embodiments, a locating engine 333 incorporated in a wireless tracking device of a victim can conduct a statistical analysis on locational information conveyed by wireless signals received by the GPS receiver 350 or the Wi-Fi or short-range receiver 352 to produce a confidence interval. As another example, the locating engine 265 of the server 210 can conduct the signal analysis on locational information received from a wireless tracking device of a victim. In various embodiments, the statistical analysis conducted at the server 210 or at a wireless tracking device (or at some other appropriate location) may comprise analysis of variance, chi-squared testing, mean square weighted deviation, regression analysis, time series analysis, Kalman filtering, or other appropriate digital signal processing technique or data analysis methodology known in the art.

Locational information of the wireless tracking device 100 can undergo such statistical analysis at the wireless tracking device 100 or at the sever 210 to define a confidence interval for the wireless tracking device 100. The computed confidence interval can produce a best estimate for area of location of the wireless tracking device 100 as well as an inner and an outer range based on a threshold likelihood. The outer range, the best estimate, and the inner range can be respectively specified by the boundary 455, the boundary 450, and the boundary 445 as illustrated in FIG. 3A.

While FIG. 3A illustrates circular boundaries 455, 450, 445, 430, 425, 420 associated with the wireless tracking device 100 and the point 405, various other boundary forms may be utilized. In the example embodiment of FIG. 3B, the boundaries 455A, 450A, 445A, 430A, 425A, 420A for the wireless tracking device 100 and the point 405 are elliptical, with a major axis 442 and a minor axis 441. The dimensions along the major and minor axes 442, 441 can result from individual statistical analyses on orthogonal signals that may specify North-South and East-West orientations, for example. In some embodiments, the orthogonal signals are based on positional sensors within the wireless tracking device 100 and are related to North or some other geographical coordinate system, for example using an electronic compass within the wireless tracking device 100. In the example of FIG. 3B, the boundaries 455B, 450B, 445B, 430B, 425B, 420B have example polygonal forms.

As illustrated in FIG. 3A, the region of the boundary 425 and the region of the boundary 425 can overlap, in an overlapping region 480. The relative area of the overlapping region 480 (or the amount of overlap) can be used to determine whether the wireless tracking device 100 is inside the geofence boundary 425. Using relative overlap can compensate for uncertainty, inaccuracy, or diminished integrity of locational information associated with the wireless tracking device 100 or the point 405.

In an example embodiment, the locating engine 265 of the server 210 or the locating engine 333 of the wireless tracking device 100 computes the area inside the geofence boundary 425, computes the area of the overlapping region 480, then computes a ratio between the area within the boundary 450 and the area of overlap. If the ratio is above a threshold value, then the locating engine 265 or the locating engine 333 can make a determination that the wireless tracking device 100 is within the geofence boundary 425. Similarly, if the computed ratio is below the threshold, then the wireless tracking device 100 can be deemed to be outside the geofence boundary 425.

In various embodiments, the determination can be made using area and overlap computations that use the inner boundaries 445, 420; the middle boundaries 450, 425; or the outer boundaries 455, 430; or combinations there of. Using the inner or outer boundaries 445, 420, 455, 430 can provide an additional level of compensation for diminished information integrity, for example.

In one example embodiment, the GPS receiver 350 provides GPS data and accuracy data representative of a circle or ellipse. Statistical data (either accompanying or derived) can indicate that an "x" percentile of points are within a certain distance from truth and "y" percentile of time it is within "z" from truth. In other words, based on an overlap of an outer circle and inner circle with an area of interest, a determination can be made regarding whether the wireless tracking device 100 is inside or outside of a defined geographical zone within a defined threshold of certainty. For example, if there was a desire to determine if the wireless tracking device 100 has entered an exclusionary zone defined by the geofence 425, the determination could be based on overlap between the region of the boundary 455 and the geofence 425. If, on the other hand, there was a desire to determine whether the wireless tracking device 100 has left an inclusionary zone, the determination could be based on overlap between the region of the boundary 445 and the geofence 425. In a scenario where an offender is deemed particularly dangerous, the determination may utilize overlap associated with the boundary 445 and overlap associated with the boundary 455, for example.

In some example embodiments, accuracy information for a point can be represented as a circle or an ellipse while accuracy information for a cell tower sector can be represented as a hexagon. In some example embodiments, overall accuracy shape is represented with a geo-fence of interest, for example a circle or polygon.

In some example embodiments, a GPS receiver 350 can provide information such as a CEP circle as opposed to a fixed accuracy measurement. For example, a CEP 50 percent circle may be 10 meters, meaning that there is a 50 percent chance that the point is within 10 meters from truth. As another example, a CEP 95 percent circle may be 100 meters, meaning that there is a 95 percent chance that the point is within 100 meters from truth.

In various embodiments, the actual accuracy information or CEP circle data can be used to determine geofence overlap and thus wireless tracking device location, for example. Based on type of zone (for example inclusion or exclusion), type of offender (for example extremely dangerous), and preference of an officer or other user, a threshold and CEP circle can be selected for location determination, for example.

Figure 4:
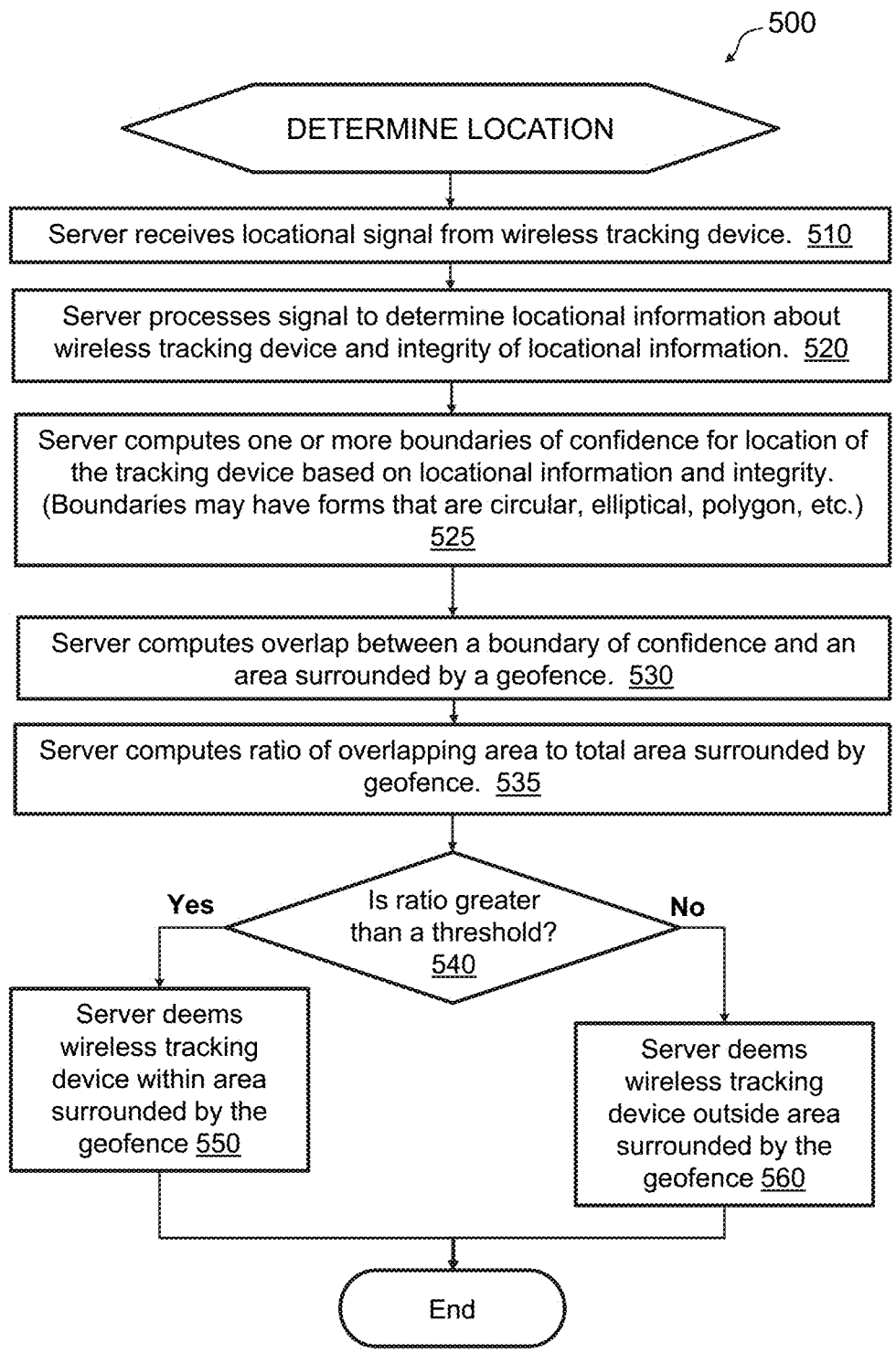
FIG. 4 is a flowchart of a process for determining location for a wireless tracking device in accordance with some example embodiments of the present technology.

An example embodiment of a process 500 for determining location for the wireless tracking device 100 will now be described in further detail with reference to the flowchart illustrated in FIG. 4. Example reference will further be made to the preceding figures, without limitation. In some example embodiments, instructions for execution of the relevant steps of process 500 can be stored in the memory 330 and executed by the microcontroller system 325 of the wireless tracking device 100 or stored in the memory 260 and executed by the microprocessor 270 of the server 210. For example, process 500 can be practiced using instructions that are provided in the locating engine 265 or in the locating engine 333, or that are divided between the two locating engines 265, 333. Recognizing that the process 500 can be implemented or practiced in various places, the process 500 will be discussed below with reference to the server embodiment, without limitation.

At block 510 of process 500, the server 210 receives a locational signal about the wireless tracking device 100, which may be produced at the wireless tracking device 100 in some example embodiments.

At block 520 of process 500, the server 210 processes the received locational signal. Processing the locational signal can comprise extracting conveyed data, conducting a statistical analysis, extracting metadata, or other appropriate form of processing. From the processing, the server 210 determines locational information about the wireless tracking device 100 and integrity of that locational information.

At block 525 of process 500, the server 210 computes one or more boundaries of confidence for location of the wireless tracking device 100, for example based on the locational information and the integrity. As discussed above, example embodiments of the computed boundaries of confidence can comprise one or more of the inner boundaries 445, 420; the middle boundaries 450, 425; or the outer boundaries 455, 430 illustrated in FIGS. 3A, 3B, and 3C.

At block 530, the server 210 computes the area of the overlap 480 between the region bounded by the boundary of confidence and the region bounded by the geofence 450.

At block 535, the server 210 computes a ratio of the area of the overlap 480 to the total area of the region surrounded by the geofence 450.

At decision block 540 of process 500, the server 210 compares the ratio to a threshold value, as discussed above. If the ratio is greater than the threshold, process 500 branches to block 550. If the ratio is not greater than the threshold, process 500 branches to block 560.

At block 550, the server 210 deems the wireless tracking device to be within the boundaries of the geofence 425. At block 560, the server 210 deems the wireless tracking device to be outside the geofence 425. Process 500 ends following execution of block 550 or 560, as appropriate.

Technology for location determination in an environment of uncertainty has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. A method for improving operation of a geofencing system in which locational measurements have error, the method comprising the steps of:
   receiving a signal that conveys information from a wireless tracking device about a location of the wireless tracking device;
   determining a first boundary that encloses a first geographic area representative of an area in which the wireless tracking device is deemed to be located;
   based on a statistical analysis of locational information about a geofence around a point of interest, determining:
   a second boundary that encloses a second geographic area representative of the geofence around the point of interest, an outer boundary representative of an outer range of the second geographic area, the outer range associated with an outer boundary of confidence for the geofence around the point of interest, and an inner boundary representative of an inner range of the second geographic area, the inner range associated with an inner boundary of confidence for the geofence around the point of interest, wherein the second boundary is disposed within the outer boundary, and the inner boundary is disposed within the second boundary;

computing an area of overlap between the first boundary enclosing the first geographic area representative of the area in which the wireless tracking device is deemed to be located and the second boundary enclosing the second geographic area representative of the geofence around the point of interest;

computing a ratio between the area of overlap and the first geographic area; and determining whether the wireless tracking device is within the second geographic area based on comparing the computed ratio to a threshold.

2. The method of claim 1, wherein the conveyed information comprises a coordinate of the wireless tracking device and associated accuracy information.

3. The method of claim 1, wherein the conveyed information comprises a coordinate of the wireless tracking device and an associated distance, and wherein the first geographic area comprises an area that is centered on the coordinate and that is dimensioned according to the associated distance.

4. The method of claim 3, wherein the area is substantially circular.

5. The method of claim 3, wherein the area is substantially elliptical.

6. The method of claim 3, wherein the area is substantially polygonal.

7. The method of claim 1, wherein the conveyed information comprises:
   a coordinate of the wireless tracking device;
   first accuracy along a major axis;
   second accuracy along a minor axis; and
   directional information, and
   wherein the first geographic area comprises an elliptical area that is centered on the coordinate, that has a size defined by the first accuracy and the second accuracy, and that has an orientation with respect to North defined by the directional information.

8. The method of claim 1, wherein the second geographical area is defined by a geofence for a fixed geographic location.

9. The method of claim 1, wherein one or more of the second boundary, the inner boundary and the outer boundary are substantially circular, substantially oval, or substantially polygonal.

10. The method of claim 1, wherein the second geographical area is defined according to location and accuracy data for a second wireless tracking device.

11. The method of claim 1, wherein a server performs the step of receiving, the step of computing the overlap, the step of computing the ratio, and the determining step.

12. A system, comprising:
   a wireless tracking device comprising a transmitter that transmits a signal comprising information about a location of the wireless tracking device and a server configured to:
      determine a first boundary that encloses a first geographic area representative of an area in which the wireless tracking device is deemed to be located;
      based on a statistical analysis of locational information about a geofence around a point of interest, determine:
         a second boundary that encloses a second geographic area representative of the geofence around the point of interest,
         an outer boundary representative of an outer range of the second geographic area, the outer range associated with an outer boundary of confidence for the geofence around the point of interest, and
         an inner boundary representative of an inner range of the second geographic area, the inner range associated with an inner boundary of confidence for the geofence around the point of interest,
            wherein the second boundary is disposed within the outer boundary, and the inner boundary is disposed within the second boundary;
      compute an area of overlap between the first boundary enclosing the first geographic area representative of the area in which the wireless tracking device is deemed to be located and the second boundary enclosing the second geographic area representative of the geofence around the point of interest;
      compute a ratio between the area of overlap and the first geographic area; and
      determine whether the wireless tracking device is within the second geographic area based on a comparison of the computed ratio to a threshold.

13. The system of claim 12, wherein the information comprises a coordinate of the wireless tracking device and an associated distance, and the first geographic area comprises an area that is centered on the coordinate and that is dimensioned according to the associated distance.

14. The system of claim 13, wherein one or more of the area, the second boundary, the inner boundary and the outer boundary are substantially circular.

15. The system of claim 13, wherein one or more of the area, the second boundary, the inner boundary and the outer boundary are substantially elliptical.

16. The system of claim 13, wherein one or more of the area, the second boundary, the inner boundary and the outer boundary are substantially polygonal.

17. The system of claim 12, wherein the information from the wireless tracking device comprises:
   a coordinate of the wireless tracking device;
   first accuracy along a major axis;
   second accuracy along a minor axis; and
   directional information, and
   wherein the first geographic area comprises an elliptical area that is centered on the coordinate, that has a size defined by the first accuracy and the second accuracy, and that has an orientation with respect to North defined by the directional information.

18. The system of claim 12, wherein the second geographical area is defined by a geofence for a fixed geographic location.

19. A system comprising:
   a network interface configured to receive a signal that conveys information from a wireless tracking device about a location of the wireless tracking device;
   memory;
   a processor that is operably coupled to the network interface and to the memory; and processor executable instructions stored in the memory for performing the steps of:

determining a first boundary that encloses a first geographic area representative of the area in which the wireless tracking device is deemed to be located;

based on a statistical analysis of locational information about a geofence around a point of interest, determining:

a second boundary that encloses a second geographic area representative of the geofence around the point of interest, an outer boundary representative of an outer range of the second geographic area, the outer range associated with an outer boundary of confidence for the geofence around the point of interest, and an inner boundary representative of an inner range of the second geographic area, the inner range associated with an inner boundary of confidence for the geofence around the point of interest, wherein the second boundary is disposed within the outer boundary, and the inner boundary is disposed within the second boundary;

computing an area of overlap the first boundary enclosing the first geographic area representative of the area in which the wireless tracking device is deemed to be located and the second boundary enclosing the second geographic area representative of the geofence around the point of interest;

computing a ratio between the area of overlap and the first geographic area; and determining whether the wireless tracking device is within the second geographic area based on comparing the computed ratio to a threshold.

20. The system of claim 19, wherein the information from the wireless tracking device comprises:

a coordinate of the wireless tracking device;

first accuracy along a major axis;

second accuracy along a minor axis; and directional information, and wherein the first geographic area comprises an elliptical area that is centered on the coordinate, that has a size defined by the first accuracy and the second accuracy, and that has an orientation with respect to North defined by the directional information.

* * * * *